United States Patent
Kitahara

(10) Patent No.: US 10,930,413 B2
(45) Date of Patent: Feb. 23, 2021

(54) SHIELD CONNECTION STRUCTURE AND WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Yuta Kitahara, Yokkaichi (JP)

(73) Assignees: AUTONETWORKS TECHNOLOGIES, LTD., Mie (JP); SUMITOMO WIRING SYSTEMS, LIMITED, Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/647,653

(22) PCT Filed: Sep. 21, 2018

(86) PCT No.: PCT/JP2018/035203
§ 371 (c)(1),
(2) Date: Mar. 16, 2020

(87) PCT Pub. No.: WO2019/069725
PCT Pub. Date: Apr. 11, 2019

(65) Prior Publication Data
US 2020/0286649 A1 Sep. 10, 2020

(30) Foreign Application Priority Data
Oct. 6, 2017 (JP) .............................. JP2017-196185

(51) Int. Cl.
*H01B 9/02* (2006.01)
*B60R 16/02* (2006.01)
(Continued)

(52) U.S. Cl.
CPC ........... *H01B 9/02* (2013.01); *B60R 16/0215* (2013.01); *H01B 7/0045* (2013.01); *H01B 7/17* (2013.01)

(58) Field of Classification Search
CPC .......... H01B 9/02; H01B 7/0045; H01B 7/17; B60R 16/0215; H02G 3/0616
(Continued)

(56) References Cited

U.S. PATENT DOCUMENTS

| 2003/0119351 | A1 | 6/2003 | Miyazaki et al. |
| 2009/0126985 | A1* | 5/2009 | Aoki .................. H01R 13/6591 174/377 |

(Continued)

FOREIGN PATENT DOCUMENTS

JP 2012-113949 A 6/2012

OTHER PUBLICATIONS

Oct. 30, 2018 International Search Report issued in International Patent Application No. PCT/JP2018/035203.

*Primary Examiner* — Sherman Ng
(74) *Attorney, Agent, or Firm* — Oliff PLC

(57) ABSTRACT

A shield connection structure that includes a tube made of metal; a flexible shield made of metal; and a ring that includes an inner ring externally fitted onto the tube and an outer ring, the ring being made of a same type of metal as the flexible shield, wherein the flexible shield is electrically connected to the tube via the ring when sandwiched between the inner ring and the outer ring.

11 Claims, 3 Drawing Sheets

(51) Int. Cl.
*H01B 7/00* (2006.01)
*H01B 7/17* (2006.01)

(58) Field of Classification Search
USPC ........................................... 174/72 A
See application file for complete search history.

(56) References Cited

U.S. PATENT DOCUMENTS

| | | | | |
|---|---|---|---|---|
| 2010/0300749 | A1* | 12/2010 | Adachi | H02G 3/22 |
| | | | | 174/840 |
| 2012/0058674 | A1* | 3/2012 | Deno | H01R 9/0518 |
| | | | | 439/607.52 |
| 2013/0248246 | A1* | 9/2013 | Oga | B60R 16/0207 |
| | | | | 174/72 A |
| 2014/0318852 | A1* | 10/2014 | Adachi | H01B 9/024 |
| | | | | 174/350 |
| 2015/0008252 | A1* | 1/2015 | Nakai | H02G 3/0666 |
| | | | | 228/110.1 |
| 2015/0090489 | A1* | 4/2015 | Eshima | H02G 3/0616 |
| | | | | 174/72 A |
| 2015/0188264 | A1* | 7/2015 | Yanagihara | H05K 9/00 |
| | | | | 174/363 |
| 2015/0287497 | A1* | 10/2015 | Shiga | H01B 7/2825 |
| | | | | 174/84 R |
| 2016/0126709 | A1* | 5/2016 | Maeda | H02G 3/0406 |
| | | | | 174/68.3 |

* cited by examiner

SHIELD CONNECTION STRUCTURE AND WIRE HARNESS

BACKGROUND

The present disclosure relates to a shield connection structure and a wire harness.

Conventionally, as an electromagnetic shield component that collectively electromagnetically shields a plurality of electric wires, an electromagnetic shield component is known in which the plurality of electric wires are collectively surrounded by a tubular flexible shield member, and the end portion of the flexible shield member is fixed to a shield shell by a caulking ring (for example, see Patent Document 1). With the caulking ring, the flexible shield member that is externally fitted onto the shield shell is tightened from the outer circumferential side, and the flexible shield member is held between the caulking ring and the outer circumferential surface of the shield shell.

SUMMARY

In the above-mentioned electromagnetic shield component, if the flexible shield member and the shield shell are made of different types of metal, there has been a problem in that electrolytic corrosion (galvanic corrosion) will occur due to water adhering to the connecting portion between the flexible shield member and the shield shell. Also, in the above electromagnetic shield component, there has been a problem in that electrolytic corrosion similarly occurs if the flexible shield member and the caulking ring are made of different types of metal.

An exemplary aspect of the disclosure provides a shield connection structure that suppresses electrolytic corrosion on a flexible shield member.

A shield connection structure according to an exemplary aspect includes A shield connection structure that includes a tube made of metal; a flexible shield made of metal; and a ring that includes an inner ring externally fitted onto the tube and an outer ring, the ring being made of a same type of metal as the flexible shield, wherein the flexible shield is electrically connected to the tube via the ring when sandwiched between the inner ring and the outer ring.

According to this configuration, the flexible shield is in contact only with the ring made of the same type of metal. Therefore, because the flexible shield is not in contact with any member other than the ring, electrolytic corrosion on the flexible shield can be suppressed.

According to the shield connection structure of the present disclosure, electrolytic corrosion on the flexible shield can be suppressed.

DETAILED DESCRIPTION OF EMBODIMENTS

Hereinafter, embodiments of the present disclosure will be described with reference to FIGS. 1 to 4. Note that, in each drawing, a part of the configuration may be exaggerated or simplified for convenience of explanation. Also, the dimensional proportion of each part may be different from the actual dimensional proportion.

Figure 1:
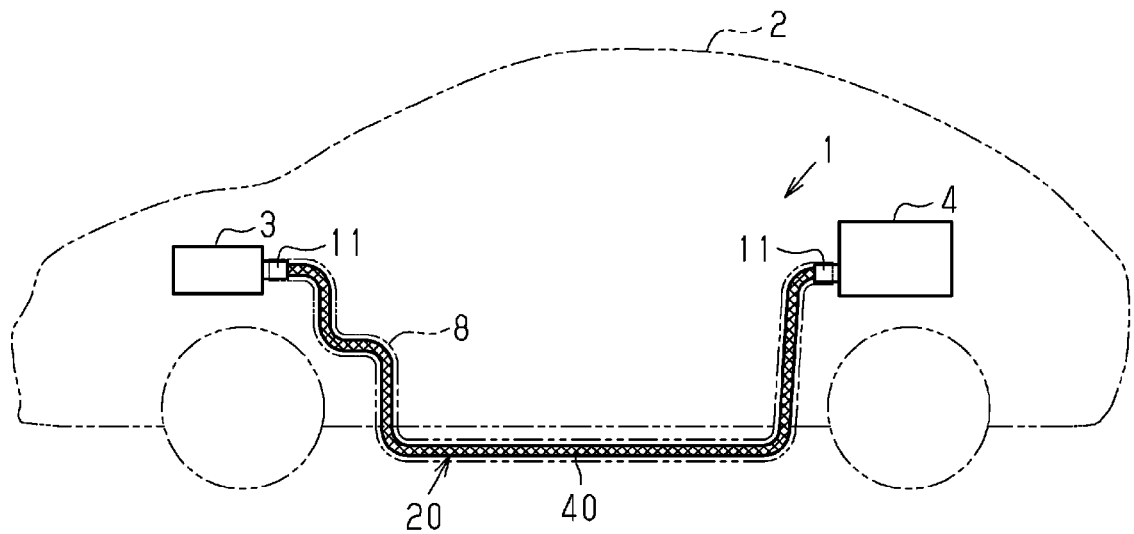
FIG. 1 is a schematic configuration diagram of a vehicle according to an embodiment.

A wire harness 1 shown in FIG. 1 electrically connects two or three or more electrical devices. In a hybrid vehicle or an electric vehicle, for example, the wire harness 1 electrically connects an inverter 3 installed at the front portion of a vehicle 2 and a high-voltage battery 4 installed at the rear portion of the vehicle 2 relative to the inverter 3. The wire harness 1 is routed so as to pass under the floor of the vehicle 2, for example. The inverter 3 is connected to a wheel driving motor (not shown) that serves as a power source for vehicle drive. The inverter 3 generates AC power from DC power of the high-voltage battery 4, and supplies the AC power to the motor. The high-voltage battery 4 is a battery capable of supplying a voltage of several hundred volts, for example.

Figure 2:
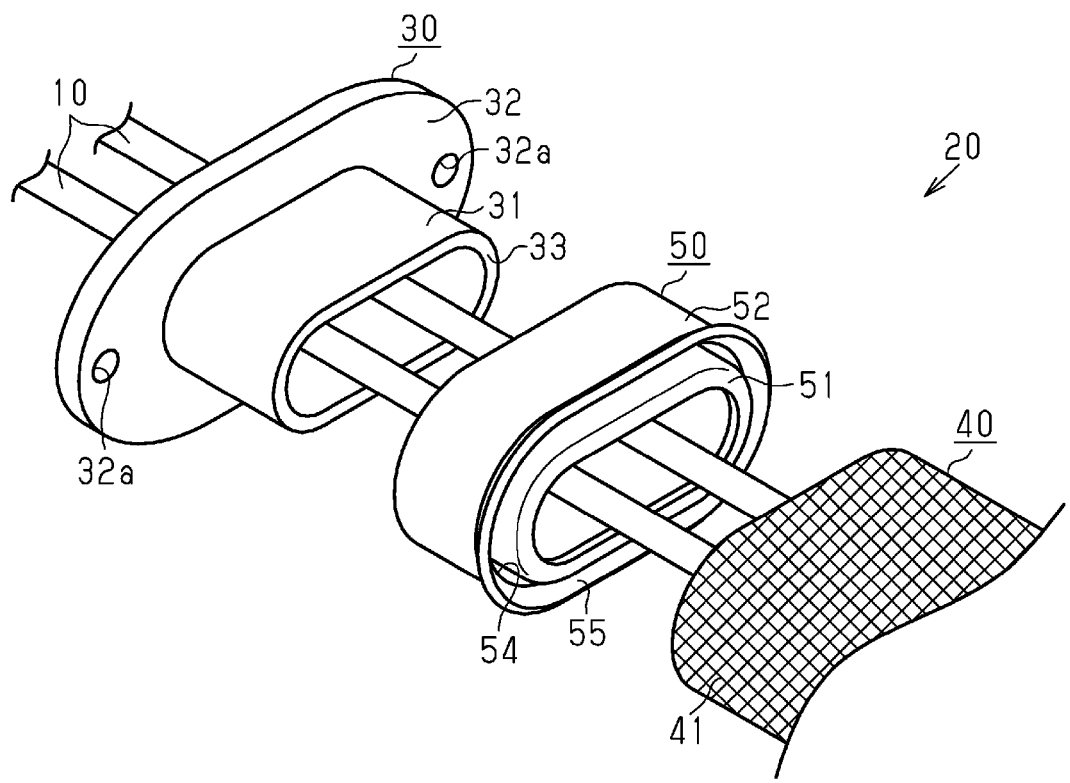
FIG. 2 is an exploded perspective view of a shield connection structure according to the embodiment.

As shown in FIGS. 1 and 2, the wire harness 1 includes a plurality (two in this embodiment) of electric wires 10, connectors 11 respectively attached to two ends of the electric wires 10, and an electromagnetic shield portion 20 that collectively surrounds the plurality of electric wires 10. Each electric wire 10 is, for example, a high-voltage electric wire that can handle a high voltage and a large current. Also, the electric wire 10 is, for example, a non-shielded electric wire that has no shield structure. One connector 11 is connected to the inverter 3, and the other connector 11 is connected to the high-voltage battery 4. The electromagnetic shield portion 20 shields electromagnetic waves emitted from the electric wires 10, and suppresses electromagnetic noise from being exerted on surrounding electrical devices, for example.

Figure 3:
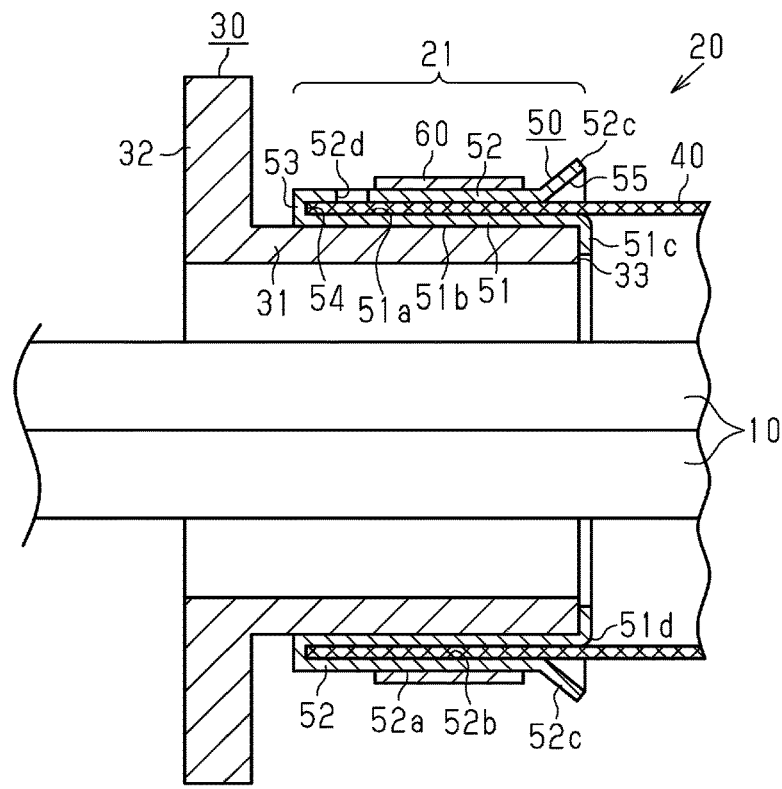
FIG. 3 is a side sectional view of a shield connection structure according to the embodiment.

As shown in FIGS. 2 and 3, the electromagnetic shield portion 20 has a long tubular shape overall. The electromagnetic shield portion 20 includes a shield shell 30, a flexible shield member 40 (flexible shield) that has flexibility, a ring member 50 (ring), and a caulking ring 60.

As shown in FIG. 3, in the electromagnetic shield portion 20, the ring member 50 is fitted onto the outer circumference of the shield shell 30, the end portion of the flexible shield member 40 is sandwiched by the ring member 50, and the caulking ring 60 is fitted onto the outer circumference of the ring member 50. Then, the flexible shield member 40 is electrically connected to the shield shell 30 when sandwiched by the ring member 50 by being caulked by the caulking ring 60. In the present embodiment, a shield connection structure 21 is configured by the shield shell 30, the end portion of the flexible shield member 40, the ring member 50, and the caulking ring 60.

Next, the shield connection structure 21 will be described in detail. Here, the shield connection structure 21 provided on the inverter 3 side will be described.

The shield shell 30 is made of metal. The shield shell 30 is made of, for example, iron, an iron alloy, aluminum, or an aluminum alloy. Also, the shield shell 30 may be subjected to a surface treatment such as tin plating or aluminum plating in accordance with the type of the constituent metal and the usage environment. The shield shell 30 of the present embodiment is made of iron or an iron alloy.

The shield shell 30 has a tubular portion 31 that has a substantially oval cross section or a substantially elliptical cross section, and a bracket portion 32 that protrudes outward in a radial direction from the end portion of the tubular portion 31. An end surface 33 is formed at the end portion of the tubular portion 31 opposite to the bracket portion 32. The bracket portion 32 is provided with bolt holes 32a for attaching the shield shell 30 to the electrical device such as the inverter 3 or the high-voltage battery 4. The shield shell 30 is attached to the inverter 3 by bolting, for example. The connector 11 (not shown in FIG. 3) to be connected to the inverter 3 is accommodated inside the shield shell 30.

The ring member 50 is externally fitted onto the tubular portion 31 of the shield shell 30. That is, the ring member 50 is provided so as to surround the outer circumferential surface of the tubular portion 31. The ring member 50 is made of the same type of metal as the flexible shield member 40. The ring member 50 of the present embodiment is made of, for example, aluminum or an aluminum alloy. That is, the ring member 50 of the present embodiment is made of a metal different from the metal constituting the shield shell 30. Note that the material of the ring member 50 is preferably a metal material having a hardness higher than that of the flexible shield member 40 among the same type of metal material as that of the flexible shield member 40.

As shown in FIGS. 2 and 3, the ring member 50 includes an inner ring portion 51 (inner ring), an outer ring portion 52 (outer ring), a joining portion 53 (joint), and an accommodation portion 54 (accommodation). The ring member 50 is, for example, a single component in which the inner ring portion 51, the outer ring portion 52, and the joining portion 53 are integrally formed. The inner ring portion 51 and the outer ring portion 52 have, for example, a tubular shape with a substantially oval cross section or a substantially elliptical cross section. The inner ring portion 51 is externally fitted onto the tubular portion 31 of the shield shell 30. The inner diameter of the inner ring portion 51 is larger than the outer diameter of the tubular portion 31. The outer ring portion 52 is disposed outside in the radial direction relative to the inner ring portion 51, and is formed slightly larger than the inner ring portion 51. The outer ring portion 52 is disposed concentrically with the inner ring portion 51, for example. The inner diameter of the outer ring portion 52 is larger than the outer diameter of the inner ring portion 51. The caulking ring 60 is externally fitted onto the outer ring portion 52.

Figure 4:
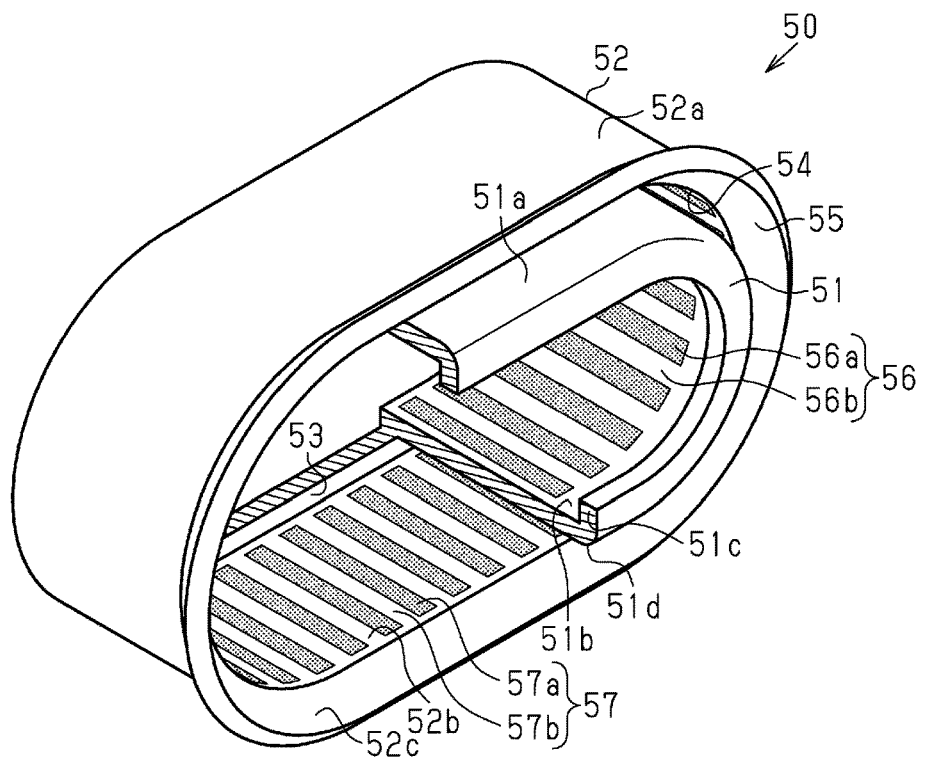
FIG. 4 is a perspective view showing a part of a ring member according to the embodiment in section.

As shown in FIGS. 3 and 4, the joining portion 53 is formed so as to connect the end portion of the inner ring portion 51 and the end portion of the outer ring portion 52. For example, the joining portion 53 is formed so as to connect the end portion of the inner ring portion 51 and the end portion of the outer ring portion 52 over the entire circumference in the circumferential direction (the entire circumference in the circumferential direction of the ring member). The joining portion 53 is formed so as to join the end portions of the inner ring portion 51 and the outer ring portion 52 on the bracket portion 32 side (that is, the back side in the insertion direction of the ring member 50 with respect to the shield shell 30). The accommodation portion 54 is constituted by the space surrounded by the inner ring portion 51, the outer ring portion 52, and the joining portion 53. An opening portion 55 for inserting the flexible shield member 40 is formed at the end portion of the accommodation portion 54 opposite to the joining portion 53. The accommodation portion 54 accommodates the end portion of the flexible shield member 40 inserted from the opening portion 55 side.

The inner ring portion 51 includes an outer circumferential surface 51a that is in contact with the flexible shield member 40 and an inner circumferential surface 51b that is in contact with the shield shell 30. At the end portion of the inner ring portion 51 opposite to the joining portion 53, a fixing portion 51c that protrudes inward in the radial direction from that end portion is formed. The fixing portion 51c comes in contact with the end surface 33 of the tubular portion 31. The insertion amount of the ring member 50 into the shield shell 30 is limited by the fixing portion 51c coming into contact with the end surface 33. A protection surface 51d is formed at the end portion of the outer circumferential surface 51a opposite to the joining portion 53. The protection surface 51d is formed as a curved surface, for example. A corner portion connecting the outer circumferential edge of the outer circumferential surface 51a and the outer circumferential surface of the fixing portion 51c is R-chamfered to form a curved protection surface 51d.

As shown in FIG. 4, on the inner circumferential surface 51b of the inner ring portion 51, serration 56 in which linear protrusions are disposed in parallel is formed. For example, the serration 56 is formed by alternately providing, in a linked manner, protruding strip portions 56a and recessed strip portions 56b extending in the axial direction of the inner ring portion 51 in the circumferential direction. Note that, in FIG. 4, the protruding strip portions 56a are denoted by a stipple pattern to make the shape of the serration 56 easier to understand.

The outer ring portion 52 includes an outer circumferential surface 52a that is in contact with the caulking ring 60 and the inner circumferential surface 52b that is in contact with the flexible shield member 40.

As shown in FIGS. 3 and 4, a guide portion 52c (guide) is provided at the end portion of the outer ring portion 52 opposite to the joining portion 53. The guide portion 52c is formed by inclining the end portion of the outer ring portion 52 outward in the radial direction so that the opening portion 55 of the accommodation portion 54 is enlarged.

As shown in FIG. 4, on the inner circumferential surface 52b of the outer ring portion 52, a serration 57 in which linear protrusions are disposed in parallel is formed. For example, the serration 57 is formed by alternately providing, in a linked manner, protruding strip portions 57a and recessed strip portions 57b extending in the axial direction of the outer ring portion 52 in the circumferential direction. Note that, in FIG. 4, the protruding strip portions 57a are denoted by a stipple pattern to make the shape of the serration 57 easier to understand.

As shown in FIG. 3, the outer ring portion 52 is provided with a communication hole 52d. The communication hole 52d is formed so as to penetrate the outer ring portion 52 in the thickness direction, and to allow the accommodation portion 54 to be in communication with the outside of the outer ring portion 52. The communication hole 52d can be formed at an any position. The communication hole 52d in this example is formed on the back side in the insertion direction of the ring member 50 relative to the caulking ring 60. The planar shape of the communication hole 52d can be set to any shape and size. The planar shape of the communication hole 52d is formed in a circular shape, for example. Here, "planar shape" refers to the shape of an object viewed from the vertical direction in FIG. 3 and the like (up-and-down direction in the drawings). Note that, in FIGS. 2 and 4, illustration of the communication hole 52d is omitted.

As shown in FIG. 2, the flexible shield member 40 has a tubular shape with a substantially oval cross section or a substantially elliptical cross section.

The flexible shield member 40 is made of the same type of metal as the ring member 50. The flexible shield member 40 of the present embodiment is made of aluminum or an aluminum alloy. That is, the flexible shield member 40 of the present embodiment is made of a metal different from the metal constituting the shield shell 30. The flexible shield member 40 is, for example, a tubular braided member formed by braiding a plurality of metal strands 41.

As shown in FIG. 3, the flexible shield member 40 is inserted into the accommodation portion 54 of the ring member 50. The end portion of the flexible shield member 40 is, for example, in contact with the joining portion 53 of the ring member 50. The insertion amount of the flexible shield member 40 into the ring member 50 is limited by the end portion of the flexible shield member 40 being in contact with the joining portion 53 in such a way.

The caulking ring 60 has a tubular shape with a substantially oval cross section or a substantially elliptical cross section. The caulking ring 60 is made of metal, for example. The caulking ring 60 of the present embodiment is made of iron or an iron alloy. That is, the caulking ring 60 of the present embodiment is made of a metal different from the metals constituting the flexible shield member 40 and the ring member 50. Before caulking is performed, the inner diameter of the caulking ring 60 is larger than the outer diameter of the outer ring portion 52 of the ring member 50.

The flexible shield member 40 is inserted into the accommodation portion 54, and the outer ring portion of the ring member 50 is externally fitted onto the shield shell 30, and in this state, the caulking ring 60 is externally fitted onto the outer ring portion 52 of the ring member 50. The caulking ring 60 is provided so as to tighten the ring member 50 and the flexible shield member 40 inward (the shield shell 30 side) from the outer circumferential side. For example, after the flexible shield member 40 is inserted into the ring member 50, the ring member 50 is externally fitted onto the shield shell 30, and the caulking 60 is externally fitted onto the ring member 50, the ring member 50 and the flexible shield member 40 are tightened by the caulking ring 60 by deforming the caulking ring 60 to reduce the diameter.

By performing caulking with the caulking ring 60, the ring member 50, the flexible shield member 40, and the shield shell 30 that are located on the inner circumferential surface side of the caulking ring 60 are fixed. At this time, the outer circumferential surface of the shield shell 30 is in contact with the inner circumferential surface 51b of the inner ring portion 51, the outer circumferential surface 51a of the inner ring portion 51 and the inner circumferential surface 52b of the outer ring portion 52 are in contact with the flexible shield member 40, and the outer circumferential surface 52a of the outer ring portion 52 is in contact with the inner circumferential surface of the caulking ring 60. As a result, the flexible shield member 40 is electrically connected to the shield shell 30 via the ring member 50 when sandwiched between the inner ring portion 51 and the outer ring portion 52. In this state, the flexible shield member 40 and the ring member 50 are sandwiched between the caulking ring 60 and the shield shell 30. Also, the communication hole 52d is exposed from the caulking ring 60.

When the caulking is performed, the inner ring portion 51 is tightened from the outside, so that the serration 56 formed on the inner circumferential surface 51b of the inner ring portion 51 are pressed against the outer circumferential surface of the shield shell 30 to be deformed. As a result, even when an oxide film is formed on the inner circumferential surface 51b of the inner ring portion 51, the oxide film is broken and the inner ring portion 51 and the shield shell 30 are electrically connected satisfactorily.

Also, when the caulking is performed, the outer ring portion 52 is tightened from the outside so that the serration 57 formed on the inner circumferential surface 52b of the outer ring portion 52 cuts into the metal strands 41 of the flexible shield member 40. As a result, even if oxide films are formed on the inner circumferential surface 52b of the outer ring portion 52 and the surface of the metal strands 41, these oxide films are broken and the outer ring portion 52 and the flexible shield member 40 are electrically connected satisfactorily.

In the above description, the shield connection structure 21 provided on the inverter 3 side has been described. Note that a shield connection structure 21 having a similar structure is also provided on the high-voltage battery 4 side.

As shown in FIG. 1, the outer circumference of the electromagnetic shield portion 20 having the shield connection structure 21 is surrounded over substantially the entire length by a protection tube 8 such as a corrugated tube or a waterproof cover, for example. The outer circumference of the electromagnetic shield portion 20 is surrounded by the protection tube 8 over the entire portion other than the bracket portion 32 of the shield shell 30.

Next, the operation and effect of the shield connection structure according to the present embodiment will be described.

(1) The flexible shield member 40 is electrically connected to the shield shell 30 via the ring member 50 when sandwiched between the inner ring portion 51 and the outer ring portion 52 of the ring member 50. According to this configuration, the flexible shield member 40 is in contact only with the ring member 50 made of the same type of metal. In other words, the flexible shield member 40 is not in direct contact with the shield shell 30 and the caulking ring 60. For this reason, even if the shield shell 30 and the caulking ring 60 are made of a metal different from that of the flexible shield member 40, it is possible to suppress electrolytic corrosion between the flexible shield member 40 and the shield shell 30, and between the flexible shield member 40 and the caulking ring 60.

(2) The flexible shield member 40 is a tubular braided member. Here, because the braided member is formed by braiding the thin metal strands 41, its surface area is large and electrolytic corrosion is likely to occur. Furthermore, because the metal strands 41 are thin metal wires, the metal strands 41 are likely to break due to electrolytic corrosion, and the shielding performance may be significantly reduced. In contrast, in the shield connection structure 21, electrolytic corrosion in the flexible shield member 40 (braided member) is suppressed by sandwiching the flexible shield member 40 with the ring member 50 that is made of same type of metal as the flexible shield member 40. With this configuration, disconnection of the metal strands 41 due to electrolytic corrosion can be suitably suppressed, and a decrease in the shield performance can be suitably suppressed.

(3) The end portion of the inner ring portion 51 and the end portion of the outer ring portion 52 are joined by the joining portion 53. According to this configuration, the ring member 50 (the inner ring portion 51, the outer ring portion 52, and the joining portion 53) can be a single component. As a result, the assembly workability of the shield connection structure 21 can be improved. Also, when the flexible shield member 40 is inserted into the accommodation portion 54, the insertion amount of the flexible shield member 40 can be limited by bringing the end portion of the flexible shield member 40 into contact with the joining portion 53. Accordingly, because the insertion amount of the flexible shield member 40 can be easily managed, the assembly workability of the shield connection structure 21 can be improved.

(4) The end portion of the inner ring portion 51 and the end portion of the outer ring portion 52 are joined by the joining portion 53 over the entire circumference of the ring member 50 in the circumferential direction, and the end portion of the flexible shield member 40 is accommodated in the accommodation portion 54 that is surrounded by the joining portion 53, the inner ring portion 51, and the outer ring portion 52. According to this configuration, the end portion of the flexible shield member 40 is prevented from protruding to the outside of the ring member 50. Accordingly, after the flexible shield member 40 is fixed to the shield shell 30, there is no need to perform post-processing such as folding or cutting on the end portion of the flexible shield member 40. As a result, the assembly workability of the shield connection structure 21 can be improved.

(5) At the end portion of the outer ring portion 52, the guide portion 52c that is inclined outward in the radial direction is formed so that the opening portion 55 of the accommodation portion 54 is enlarged. According to this configuration, when the flexible shield member 40 is inserted into the ring member 50, the end portion of the flexible shield member 40 is guided into the accommodation portion 54 along the inclined surface of the guide portion 52c. With this configuration, because the flexible shield member 40 can be easily inserted into the accommodation portion 54 of the ring member 50, the assembly workability of the shield connection structure 21 can be improved.

(6) The outer ring portion 52 is provided with the communication hole 52d that allows the accommodation portion 54 and the outside of the outer ring portion 52 to communicate with each other. According to this configuration, it can be visually confirmed through the communication hole 52d that the flexible shield member 40 is inserted to the position where the communication hole 52d is provided. Accordingly, it is possible to easily understand that the flexible shield member 40 is accommodated in the accommodation portion 54, and the insertion amount of the flexible shield member 40.

(7) A curved surface is formed as the protection surface 51d at the end portion of the outer circumferential surface 51a of the inner ring portion 51. According to this configuration, for example, even if the flexible shield member 40 swings due to vibration during traveling, the flexible shield member 40 comes into contact with the curved protection surface 51d. Accordingly, it is possible to prevent the metal strands 41 of the flexible shield member 40 from being disconnected due to wear. For this reason, it is possible to suppress a decrease in the shield performance of the shield connection structure 21.

(8) At the end portion of the inner ring portion 51, the fixing portion 51c that protrudes inward in the radial direction from that end portion is formed. According to this configuration, when the ring member 50 is externally fitted onto the tubular portion 31 of the shield shell 30, the insertion amount of the ring member 50 can be limited by bringing the fixing portion 51c of the ring member 50 into contact with the end surface 33 of the shield shell 30. Accordingly, the ring member 50 can be easily positioned in the axial direction of the shield shell 30, and the assembly workability of the shield connection structure 21 can be improved.

(9) On the inner circumferential surface 52b of the outer ring portion 52, the serration 57 is formed in which the protruding strip portions 57a and the recessed strip portions 57b extending along the axial direction of the outer ring portion 52 are alternately arranged, in a linked manner, in the circumferential direction. According to this configuration, the ring member 50 and the flexible shield member 40 are caulked when sandwiched between the shield shell 30 and the caulking ring 60. As a result, the metal strands 41 are greatly deformed in the vicinity of the serration 57, and an oxide film formed on the surface of the metal strands 41 is broken. Furthermore, the protruding strip portions 57a of the serration 57 are crushed and greatly deformed, and an oxide film formed on the surface of the serration 57 is broken. As a result, the reliability of the electrical connection between the inner circumferential surface 52b of the outer ring portion 52 and the flexible shield member 40 can be improved.

(10) On the inner circumferential surface 51b of the inner ring portion 51, the serration 56 is formed in which the protruding strip portions 56a and the recessed strip portions 56b extending along the axial direction of the inner ring portion 51 are alternately arranged, in a linked manner, in the circumferential direction. According to this configuration, the ring member 50 and the flexible shield member 40 are caulked when sandwiched between the shield shell 30 and the caulking ring 60. As a result, the protruding strip portions 56a of the serration 56 are crushed and greatly deformed, and an oxide film formed on the surface of the serration 56 is broken. As a result, the electrical connection reliability between the inner circumferential surface 51b of the inner ring portion 51 and the shield shell 30 can be improved.

(11) The flexible shield member 40 is made of aluminum or an aluminum alloy. According to this configuration, because aluminum or an aluminum alloy is a metal having a relatively small specific gravity, for example, the shield connection structure 21 can be reduced in weight compared to the case where the flexible shield member 40 is made of copper or a copper alloy.

(12) The communication hole 52d is formed on the back side in the insertion direction of the ring member 50 relative to the caulking ring 60. That is, the communication hole 52d is provided between the caulking ring 60 and the joining portion 53. According to this configuration, even after the caulking ring 60 is caulked to the shield shell 30, it can be visually confirmed through the communication hole 52d that the flexible shield member 40 is inserted to the position where the communication hole 52d is provided. As a result, the assembly reliability of the shield connection structure 21 can be improved.

(13) The wire harness 1 includes the electric wires 10 and the shield connection structure 21. According to this configuration, even if water adheres to the shield connection structure 21, electrolytic corrosion on the flexible shield member 40 can be suppressed. Accordingly, because the waterproof structure such as a corrugated tube and a waterproof cover can be eliminated around the shield connection structure 21, the wire harness 1 can be reduced in size. Furthermore, because the number of parts is reduced, the cost of the wire harness 1 can be reduced.

Other Embodiments

The above embodiment may be modified as follows.
In the above embodiment, the flexible shield member 40 is inserted into the ring member 50 so that the end portion of the flexible shield member 40 is in contact with the joining portion 53 of the ring member 50. However, the insertion amount of the flexible shield member 40 is not limited to this. For example, the insertion amount of the flexible shield member 40 relative to the ring member 50 may be an amount sufficient to fix the flexible shield member 40 to the shield shell 30 via the ring member 50 when caulked by the caulking ring 60.

In the above embodiment, a braided member is used as the flexible shield member 40, but the present disclosure is not limited to this. As the flexible shield member 40, any shield member having flexibility may be used. For example, a metal foil may be used instead of a braided member.

In the above embodiment, the protection surface 51*d* is formed as a curved surface, but the present disclosure is not limited to this. The protection surface 51*d* may be formed in a tapered shape that tapers toward the end portion.

In the above embodiment, the protection surface 51*d* is formed at the end portion of the outer circumferential surface 51*a* of the inner ring portion 51, but the present disclosure is not limited to this. The protection surface 51*d* may also be provided, for example, at the end portion of the inner circumferential surface 52*b* of the outer ring portion 52, or the protection surfaces 51*d* may also be provided on both the end portion of the outer circumferential surface 51*a* of the inner ring portion 51 and the end portion of the inner circumferential surface 52*b* of the outer ring portion 52. Also, the formation of the protection surface 51*d* may also be omitted.

In the above embodiment, the guide portion 52*c* is provided at the end portion of the outer ring portion 52, but the present disclosure is not limited to this. The guide portion 52*c* may also be provided, for example, at the end portion of the inner ring portion 51, or the guide portions 52*c* may also be provided on the end portions of the inner ring portion 51 and the outer ring portion 52. Also, the formation of the guide portion 52*c* may also be omitted.

In the above embodiment, the end portion of the inner ring portion 51 is provided with the fixing portion 51*c* protruding inward in the radial direction from that end portion, but the present disclosure is not limited to this. The fixing portion 51*c* may also be formed, for example, so as to protrude inward in the radial direction from portions other than the end portion of the inner ring portion 51 (that is, the intermediate portion in the axial direction of the inner ring portion 51). Also, the formation of the fixing portion 51*c* may also be omitted.

In the above embodiment, the planar shape of the communication hole 52*d* is formed in a circular shape, but the present disclosure is not limited to this. The planar shape of the communication hole 52*d* may also be formed in a slit shape, a square shape, or an elliptical shape, for example.

In the above embodiment, the communication hole 52*d* is formed so as to penetrate the outer ring portion 52 in a direction perpendicular to the outer circumferential surface 52*a* of the outer ring portion 52, but the present disclosure is not limited to this. The communication hole 52*d* may also be inclined with respect to the outer circumferential surface 52*a* of the outer ring portion 52, for example.

In the above embodiment, the serrations 56 and 57 are formed by alternately providing, in a linked manner, the protruding strip portions 56*a* and 57*a* and the recessed strip portions 56*b* and 57*b* extending in the axial direction of the ring member 50 in the circumferential direction. However, the present disclosure is not limited to this. The extending direction and the linking direction of the protruding strip portions 56*a* and 57*a* and the recessed strip portions 56*b* and 57*b* in the serrations 56 and 57 may be set to any directions. The serrations 56 and 57 may also be formed by, for example, alternately providing, in a linked manner, the protruding strip portions 56*a* and 57*a* and the recessed strip portions 56*b* and 57*b* extending in the circumferential direction of the ring member 50 in the axial direction. Also, the protruding strip portions 56*a* and 57*a* and the recessed strip portions 56*b* and 57*b* may also be formed so as to extend along a direction inclined with respect to the axial direction (or the circumferential direction) of the ring member 50. The protruding strip portions 56*a* and 57*a* and the recessed strip portions 56*b* and 57*b* may also be provided, in a linked manner, in a direction inclined with respect to the axial direction (or the circumferential direction) of the ring member 50.

Figure 5:
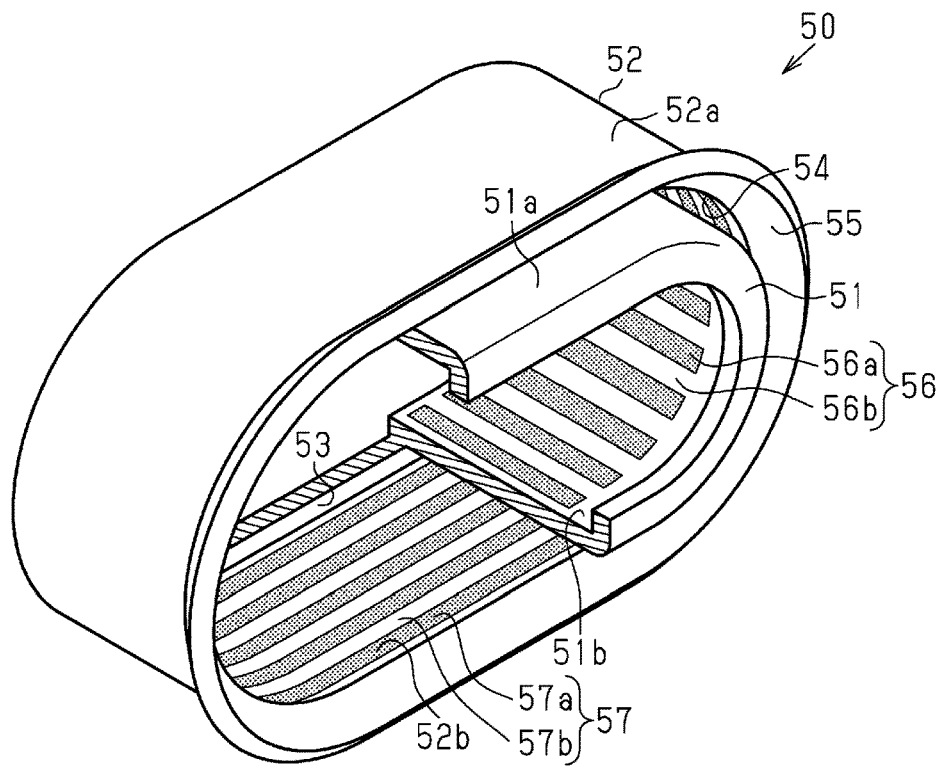
FIG. 5 is a perspective view showing a part of a ring member according to a modification in section.

Furthermore, when a plurality of serrations are provided on the ring member 50, the extending direction and the linking direction of the protruding strip portions and the recessed strip portions of each serration can be set independently and freely. As shown in FIG. 5, for example, the serrations 56 and 57 may also be disposed so as to intersect with each other. In the example shown in FIG. 5, the serration 57 is formed by alternately providing, in a linked manner, the protruding strip portions 57*a* and the recessed strip portions 57*b* extending in the circumferential direction of the ring member 50 in the axial direction, and the serration 56 is formed by alternately providing, in a linked manner, the protruding strip portions 56*a* and the recessed strip portions 56*b* extending in the axial direction of the ring member 50 in the circumferential direction.

Further, the serration 56 and the serration 57 in the above embodiment may also be formed by a plurality of protruding portions having a discontinuous circular shape or a polygonal shape.

In the above embodiment, the serration 57 is provided on the inner circumferential surface 52*b* of the outer ring portion 52 in order to improve the reliability of the electrical connection between the ring member 50 and the flexible shield member 40, but the present disclosure is not limited to this. The serration 57 may also be provided, for example, on the outer circumferential surface 51*a* of the inner ring portion 51, or the serration 57 may also be provided on both the outer circumferential surface 51*a* of the inner ring portion 51 and the inner circumferential surface 52*b* of the outer ring portion 52.

In the above embodiment, the serration 56 is provided on the inner circumferential surface 51*b* of the inner ring portion 51 in order to improve the reliability of the electrical connection between the ring member 50 and the shield shell 30, but the present disclosure is not limited to this. The serration 56 may also be provided, for example, on the outer circumferential surface of the shield shell 30, or the serration 56 may also be provided on both the inner circumferential surface 51*b* of the inner ring portion 51 and the outer circumferential surface of the shield shell 30.

In the above embodiment, the joining portion 53 joins the inner ring portion 51 and the outer ring portion 52 over the entire circumferential direction of the ring member 50, but the present disclosure is not limited to this. The joining portion 53 may also have a region in which the inner ring portion 51 and the outer ring portion 52 are not connected, for example. Alternatively, the ring member 50 may not include the joining portion 53, and the inner ring portion 51 and the outer ring portion 52 may also be separate.

In the above embodiment, the caulking ring 60 is used as a fixing member for fixing the ring member 50 and the flexible shield member 40 to the shield shell 30, but the present disclosure is not limited to this. Instead of the caulking ring 60, a metal band may also be used, for example.

In the above embodiment, the ring member 50 and the flexible shield member 40 are fixed to the shield shell 30 using the caulking ring 60, but the fixing method is not limited to this. That is, it is sufficient that the flexible shield member 40 is fixed to the shield shell 30 when held by the ring member 50, and the fixing method is not particularly limited. For example, a fixing method that plastically deforms the processing target while relatively rotating a jig and the processing target may be employed. Examples of such plastic deformation processing methods include spinning processing and swaging processing. When employing such a fixing method, for example, the ring member 50 that sandwiches the flexible shield member 40 is externally fitted onto the shield shell 30, and the ring member 50 is subjected to spinning processing or swaging processing, whereby the ring member 50 is fixed to the shield shell 30. Specifically, while the ring member 50 (the outer ring portion 52) to be processed and the jig are relatively rotated, the jig is brought into contact with the outer ring portion 52 from the outside and plastically deformed so as to reduce the diameter of the outer ring portion 52.

Figure 6:
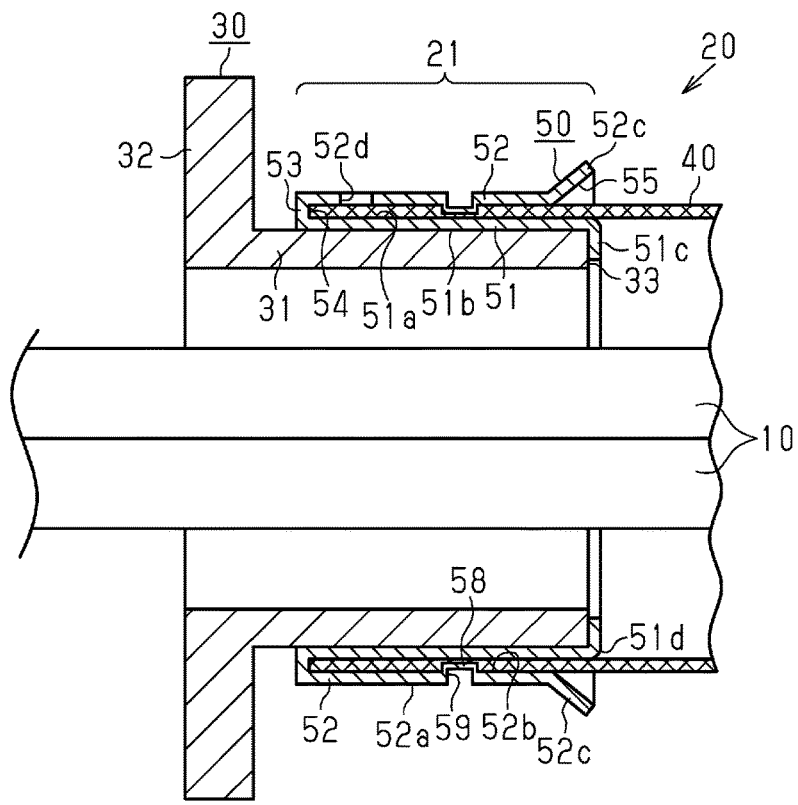
FIG. 6 is a side sectional view of a shield connection structure according to the modification.

As a result, as shown in FIG. 6, the reduced diameter portion of the outer ring portion 52 is provided with a protrusion 58 protruding inward in the radial direction relative to the inner circumferential surface of the outer ring portion 52, and a groove 59 is formed at a position corresponding to the protrusion 58 of the outer circumferential surface of the outer ring portion 52. The protrusion 58 and the groove 59 are formed over the entire circumference of the outer ring portion 52 in the circumferential direction. Due to the protrusion 58, the flexible shield member 40 is held between the inner ring portion 51 and the outer ring portion 52 in a pressed state. Also, the flexible shield member 40 and the inner ring portion 51 are tightened from the outer circumferential side to the inner side (the shield shell 30 side) by the protrusion 58, and the flexible shield member 40, the inner ring portion 51, and the shield shell 30 positioned inside the protrusion 58 are fixed. As a result, the flexible shield member 40 is fixed and electrically connected to the shield shell 30 via the ring member 50 when sandwiched between the inner ring portion 51 and the outer ring portion 52. If such a fixing method is employed, the caulking ring 60 can be omitted.

Note that the protrusion 58 and the groove 59 are formed, for example, at the position apart from the end portion of the outer ring portion 52. In other words, a portion that is not reduced in diameter is located at the end portion of the outer ring portion 52.

The configuration of the electromagnetic shield portion 20 in the above embodiment is not particularly limited. In the electromagnetic shield portion 20 of the above embodiment, the portion between the pair of the shield shells 30 is constituted by one flexible shield member 40, but the present disclosure is not limited to this. The portion between the pair of the shield shells 30 may also be constituted by, for example, a metal pipe and a pair of flexible shield members 40. In this case, the intermediate portion in the length direction (for example, underfloor routing section) of the electromagnetic shield portion 20 is constituted by a metal pipe, and the range including two ends in the length direction and excluding the portion constituted by the metal pipe is constituted by the flexible shield member 40. In this case, one end portion of each flexible shield member 40 is connected to the shield shell 30, and the other end portion of each flexible shield member 40 is connected to the end portion of the metal pipe. At this time, the shield connection structure 21 may also be formed at the joining portion between the end portion of the metal pipe and the end portion of the flexible shield member 40. In this case, the metal pipe is a tubular member/tube.

Note that the metal pipe also functions as the protection tube 8. For this reason, the protection tube 8 in the above modification may also be configured by the metal pipe that is a part of the electromagnetic shield portion 20, and a corrugated tube or a waterproof cover that surrounds the flexible shield member 40.

In the above embodiment, two shield connection structures 21 are provided on the electromagnetic shield portion 20. However, one or three or more shield connection structures 21 may also be provided. In the above modification, for example, the shield connection structures 21 may also be provided at respective ends of each of the pair of the flexible shield member 40, and the four shield connection structures 21 may also be provided on the electromagnetic shield portion 20.

In the above embodiment, two electric wires 10 constitute the wire harness 1, but the present disclosure is not limited to this. The number of the electric wires 10 can be changed according to the specifications of the vehicle 2. One or three or more electric wires 10 may also be used, for example.

The above embodiment and modifications may also be combined as appropriate.

It will be apparent to those skilled in the art that the present disclosure may also be embodied in other specific forms without departing from the technical spirit thereof. For example, some of the parts described in the embodiment (or one or more aspects thereof) may also be omitted or combined.

The invention claimed is:

1. A shield connection, structure comprising:
a tube made of metal;
a flexible shield made of metal; and
a ring including:
an inner ring externally fitted onto the tube and an outer ring, the ring being made of a same type of metal as the flexible shield,
a joint that joins the inner ring and the outer ring, and
an accommodation surrounded by the inner ring, the outer ring, and the joint, and an end of the flexible shield is inserted into the accommodation,
wherein the flexible shield is sandwiched between the inner ring and the outer ring, and the flexible shield is electrically connected to the tube via the ring.

2. The shield connection structure according to claim 1, wherein the joint joins the inner ring and the outer ring over an entire circumference in a circumferential direction of the ring.

3. The shield connection structure according to claim 1, wherein a guide that is inclined away from the accommodation is formed on at least one of ends of the inner ring and the outer ring.

4. The shield connection structure according to claim 1, wherein the outer ring includes a communication hole that allows the accommodation to communicate with an outside of the outer ring.

5. The shield connection structure according to claim 1, wherein a protection surface formed in a tapered shape or a curved shape is formed on at least one of end portions of an outer circumferential surface of the inner ring and an inner circumferential surface of the outer ring.

6. The shield connection structure according to claim 1, wherein a fixing portion protruding inward in a radial direction is formed at an end of the inner ring.

7. The shield connection structure according to claim 1, wherein serration is formed on at least one of an outer circumferential surface of the inner ring and an inner circumferential surface of the outer ring.

8. The shield connection structure according to claim 1, wherein serration is formed on at least one of an inner circumferential surface of the inner ring and an outer circumferential surface of the tube.

9. The shield connection structure according to claim 1, wherein the flexible shield is made of aluminum or an aluminum alloy.

10. The shield connection structure according to claim 1, further comprising a fixing member that sandwiches the flexible shield and the ring with the tube.

11. A wire, harness comprising:
an electric wire; and
an electromagnetic shield that includes the shield connection structure according to claim 1, and the electromagnetic shield surrounds the electric wire.

* * * * *